April 19, 1966 F. D. HICKEY ETAL 3,246,677
METHOD AND APPARATUS FOR PREPARING FRUIT
Filed July 2, 1962 7 Sheets-Sheet 2

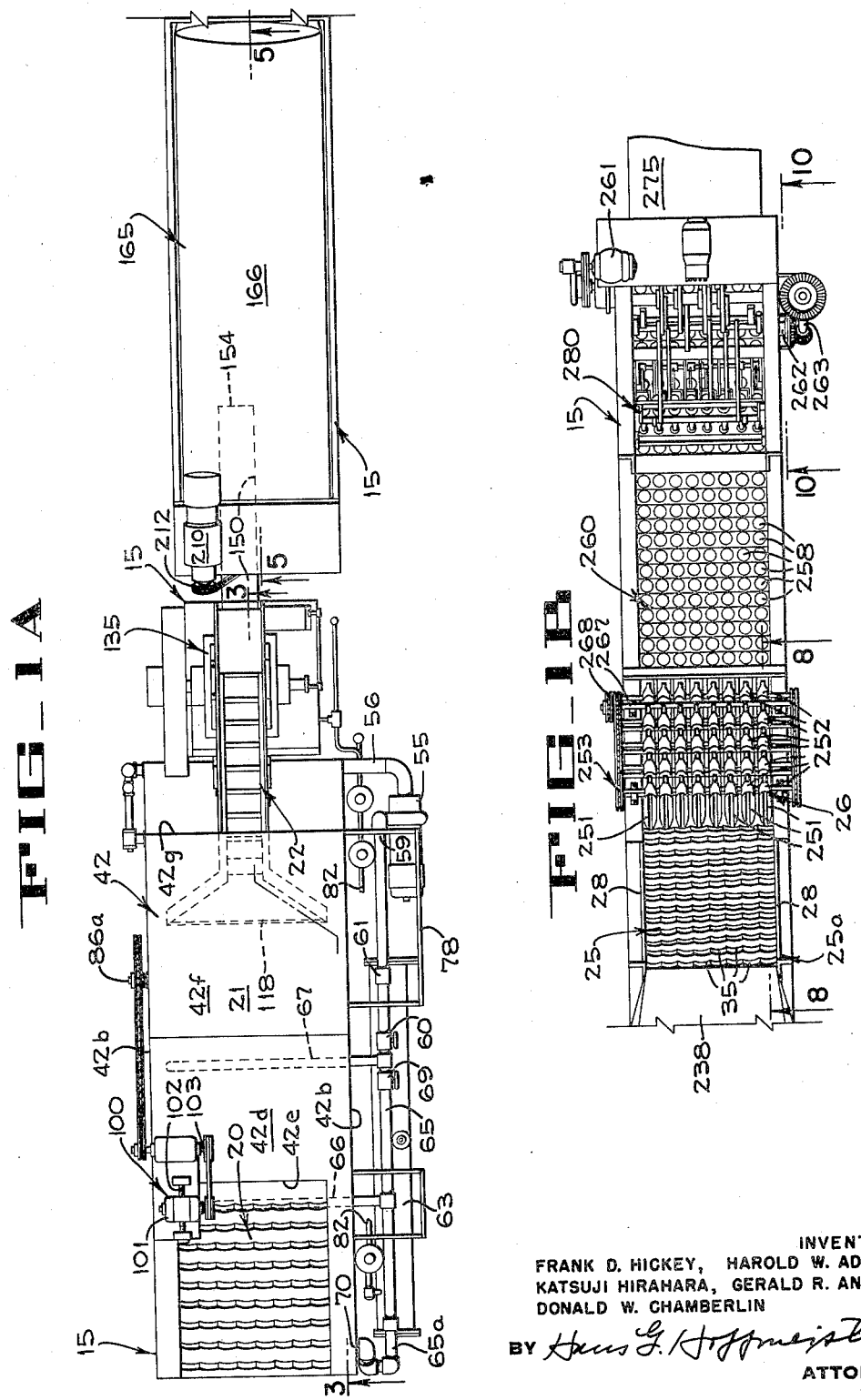

INVENTORS
FRANK D. HICKEY, HAROLD W. ADAMS
KATSUJI HIRAHARA, GERALD R. ANDERSON
DONALD W. CHAMBERLIN

BY *Hans G. Hoffmeister*
ATTORNEY

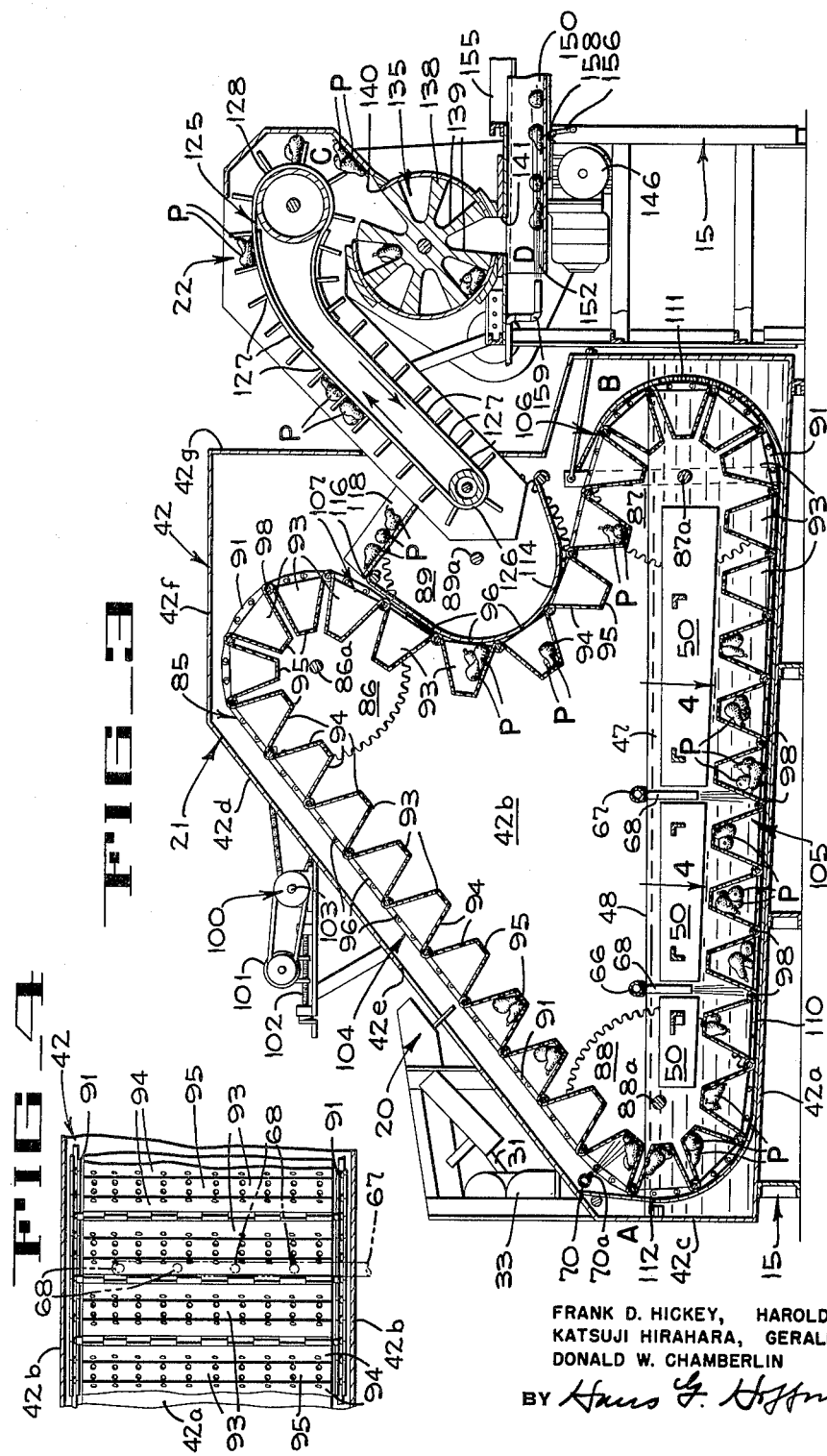

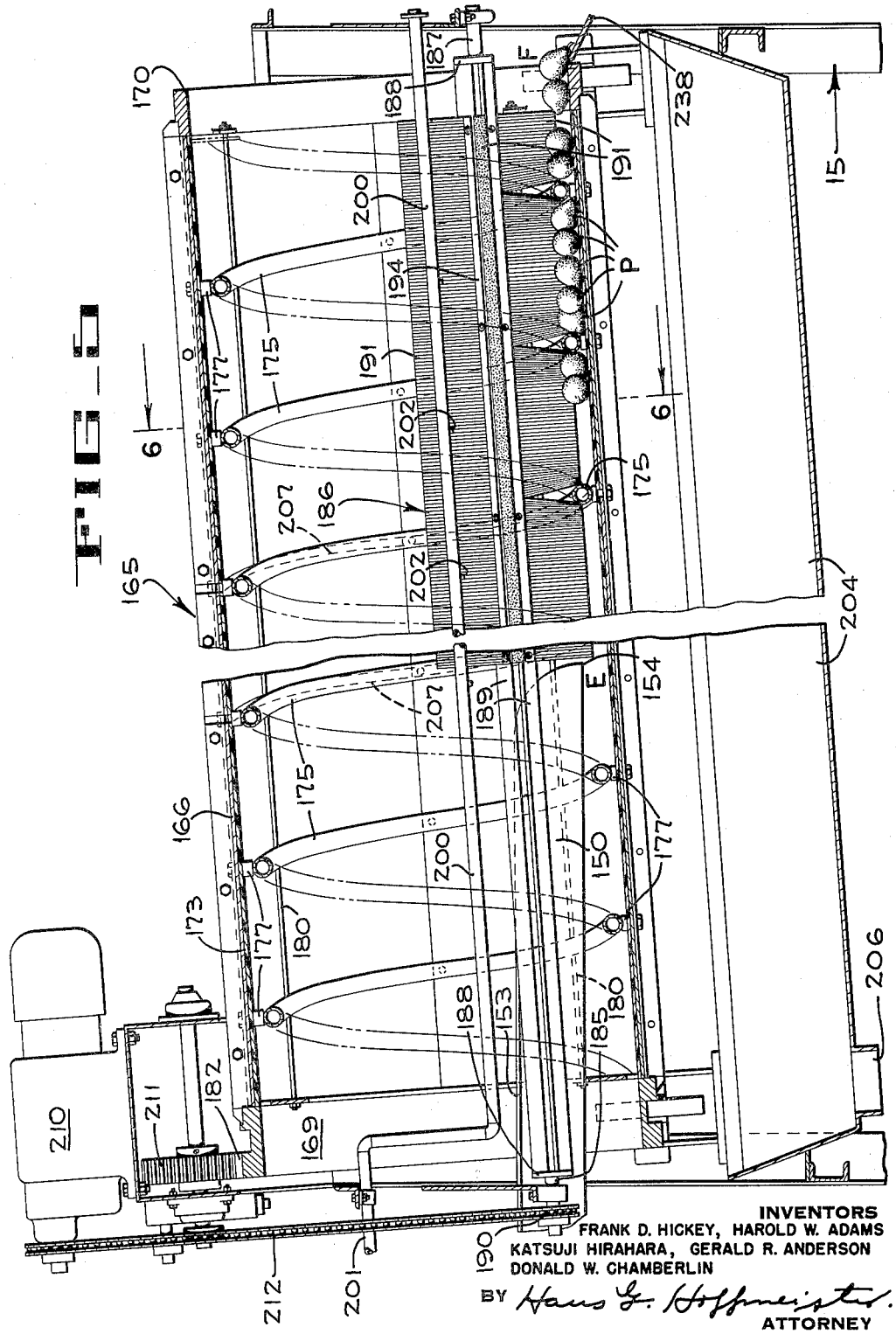

April 19, 1966  F. D. HICKEY ET AL  3,246,677
METHOD AND APPARATUS FOR PREPARING FRUIT
Filed July 2, 1962  7 Sheets-Sheet 5
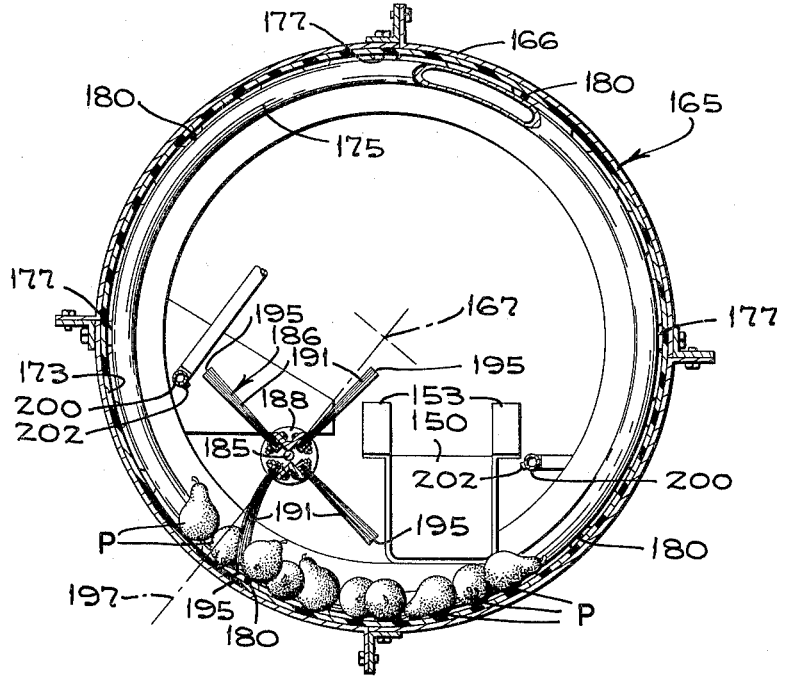
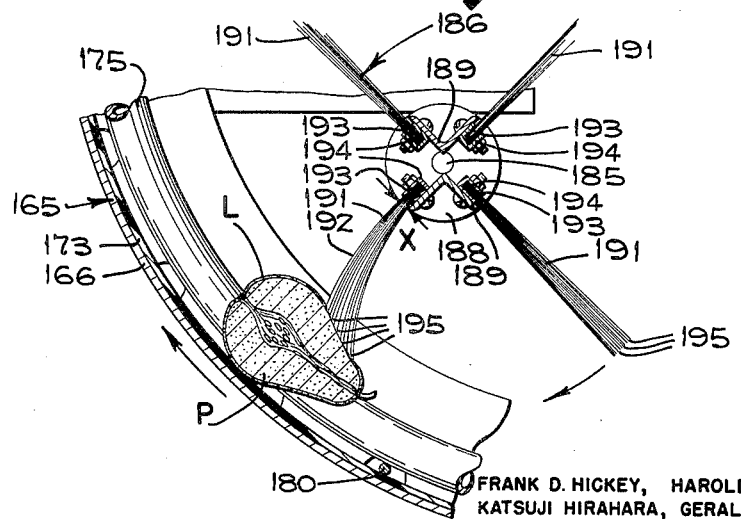
INVENTORS
FRANK D. HICKEY, HAROLD W. ADAMS
KATSUJI HIRAHARA, GERALD R. ANDERSON
DONALD W. CHAMBERLIN
BY Hans G. Hoffmeister
ATTORNEY

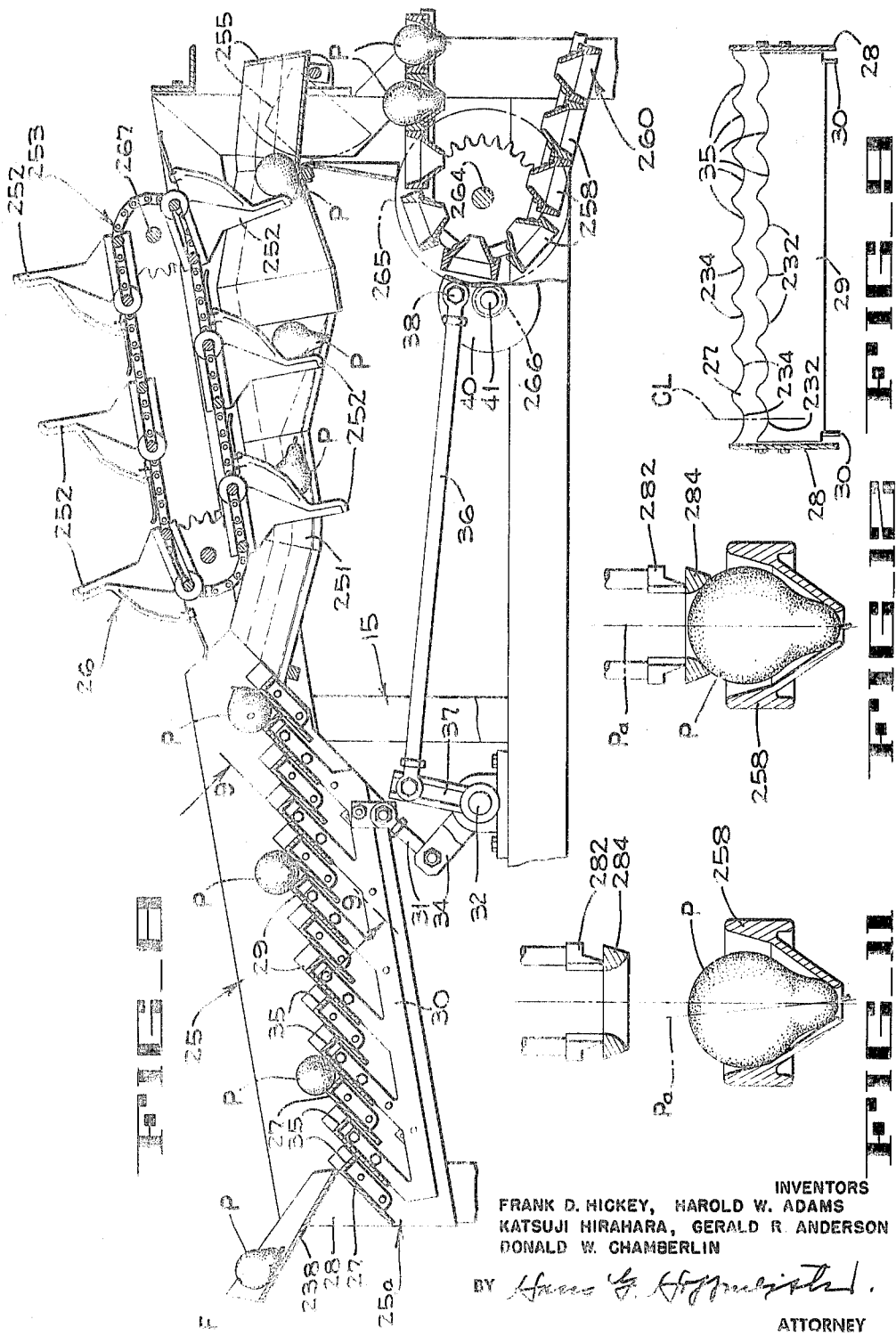

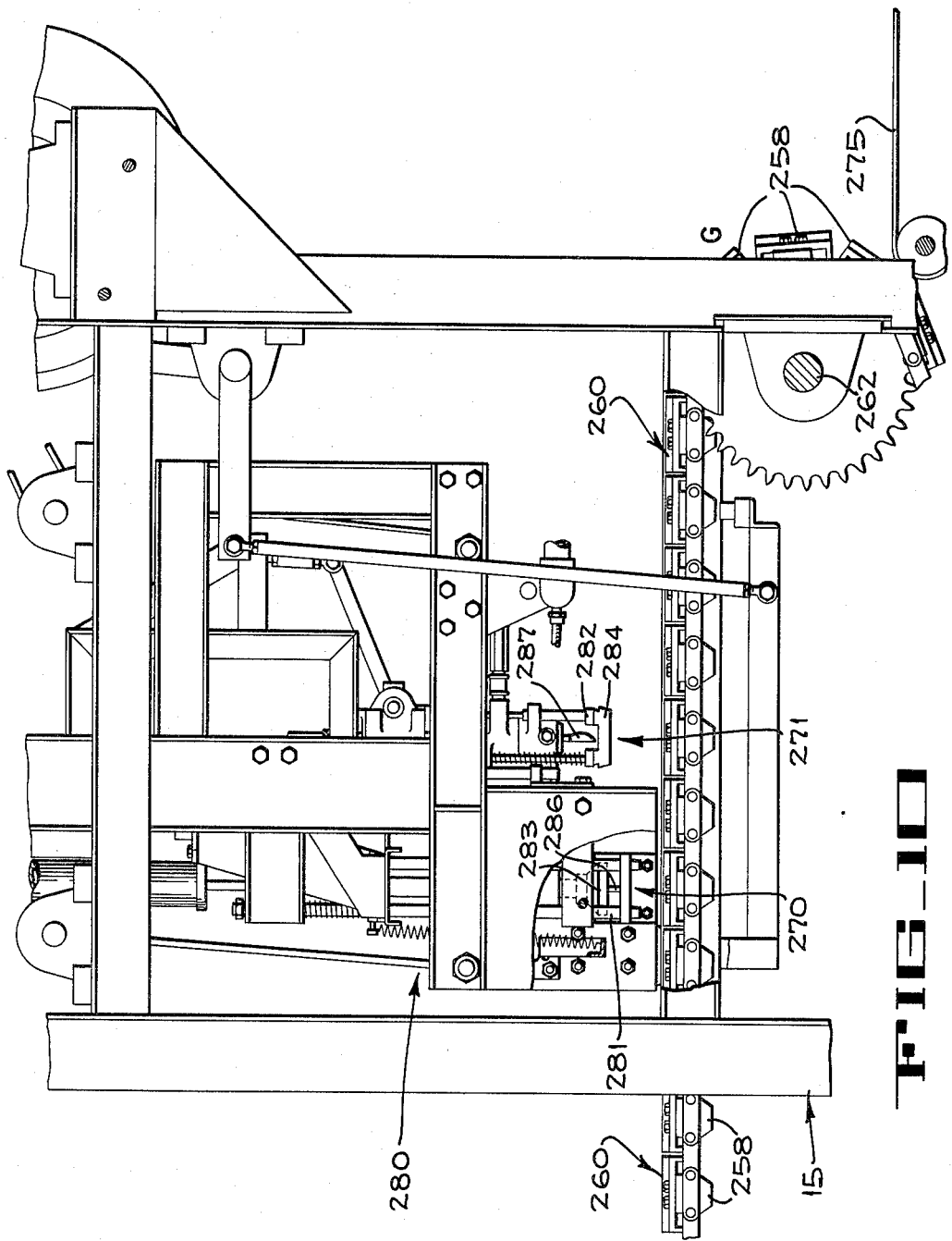

United States Patent Office 3,246,677
Patented Apr. 19, 1966

3,246,677
METHOD AND APPARATUS FOR
PREPARING FRUIT
Frank D. Hickey, Harold W. Adams, and Katsuji Hirahara, San Jose, Gerald R. Anderson, Campbell, and Donald W. Chamberlin, Los Gatos, Calif., assignors to FMC Corporation, San Jose, Calif., a corporation of Delaware
Filed July 2, 1962, Ser. No. 206,786
19 Claims. (Cl. 146—231)

The present invention pertains to a method and apparatus for preparing fruit and, more particularly, to a method and apparatus for chemically and mechanically preparing pome fruit for preservation, as by canning.

In preparing pears and other pome fruits for canning, it is desirable to remove the more inedible portions of the fruit including the peel, the stem, the seed cell, and the calyx with a minimum of loss of the more edible portion. Until the development of the present invention, it has been almost universal commercial practice to remove these inedible portions entirely by mechanical means. For example, knives have been used to remove the peel, the seed cell and the calyx, and a sharpened tube has been employed to remove the stem.

Although machines for mechanically preparing pears are widely used, many of them do not perform their peeling functions with maximum satisfaction. That is, such machines either peel so deeply as to waste edible portions, or they peel so lightly as to require subsequent hand trimming. Furthermore, it is difficult to overcome these problems in a mechanical peeler because of the variations in contour of pears.

Therefore, the present invention employs chemical peeling, that is, immersion of the pears in a fluid medium, so that the depth of fruit removed is more precisely controlled and so that there is a greater uniformity of surface treatment irrespective of the pear contour. The significant result is greater yield of edible fruit.

Chemical peeling of various fruits has been known, but the present invention makes chemical peeling of pome fruit commercially practicable whereas previously it has not been. That is, although it has been known that the peel of a pear, for example, could be removed by immersion of the pear in a lye bath, several problems have prevented the practical application of lye peeling for canning pears on a commercial basis.

One of these problems is the tendency of lye-peeled pears to turn brown at a rapid rate. More specifically, common lye peeling of stone fruits, such as peaches, involves immersion of the fruit in a hot lye solution of 1% to 5%, that is relatively dilute, concentration at or near its boiling point. Such a method of peeling as applied to pears requires from one to three minutes to disintegrate the skin but leaves a heated layer of plasmolyzed cells about 3/16 of an inch deep in the remaining pear flesh. This heated layer turns brown very rapidly, within approximately sixty seconds, probably due to enzymatic action or oxidation. If pears containing this brown layer are canned, the brown pigment diffuses through the flesh of the pears given them a creamy to yellowish tint, rather than the white appearance of normal fruit. Accordingly, the commercial value of such discolored fruit is considerably reduced.

A further problem in attempting to lye-peel pears according to previously known practices is the problem of removing the unedible stem, seed cell, and calyx by mechanical means following chemical peeling. In order to remove these unedible portions, it is necessary to handle the pears with mechanical devices so that they can be oriented and held in a predetermined position for action thereon by knives and other cutting tools. Any mechanical handling, of course, involves contact with the outer surface of the pear. Thus, if the pears are peeled by common lye peeling methods, such as outlined above, the exposed flesh is too delicate and soft to be handled by conventional mechanical equipment. On the other hand, if the pears are stemmed and cored prior to lye peeling, the lye enters the pear cavities causing destruction of internal tissues and added loss of edible flesh.

Therefore, it is an object of the present invention to provide a novel, efficient method and apparatus for chemically and mechanically preparing pome fruit, especially pears and apples, for preservation, as by canning.

Another object is to provide a method and apparatus which renders the chemical peeling of pome fruit practical for commercial use.

Another object is to provide a method and apparatus for caustically peeling pome fruit so as to minimize and/or to retard subsequent browning of the fruit.

Another object is to provide a method and apparatus for chemically peeling whole pome fruit so that the fruit are conditioned for mechanical handling, subsequent to peeling, during stemming and coring operations.

Another object is to provide a method and apparatus for peeling, stemming and coring pome fruit by cooperative chemical and mechanical actions so that the inedible portions of the fruit are removed whereas a maximum of edible portions are retained.

Another object is to provide a method and apparatus for treating pome fruit so that a layer, including flesh alone or both skin and flesh, of fruit of predetermined depth is disintegrated, softened, cellularly damaged, or otherwise preconditioned for removal, and for removing said layer without adversely affecting the flesh underlying said layer.

Another object is to provide an apparatus for immersing fruit in a treating liquid so that the entire outer surface of each fruit is substantially uniformly coated with treating liquid when the fruit is removed from the liquid.

These, together with other objects, will become apparent upon reference to the following description and accompanying drawings, in which:

FIGS. 1A and 1B are diagrammatic plans of two portions of a fruit preparing apparatus embodying the present invention and with which the present method can be practiced, it being understood that the left end of the portion in FIG. 1B connects onto the right end of the portion in FIG. 1A in the actual apparatus.

FIGS. 2A and 2B are diagrammatic side elevations of the portions of the apparatus shown in FIGS. 1A and 1B, respectively.

FIG. 3 is an enlarged longitudinal section taken on line 3—3 in FIG. 1A and, at selected locations, showing pears being conveyed through the apparatus.

FIG. 4 is a fragmentary horizontal section taken on a plane indicated by line 4—4 in FIG. 3.

FIG. 5 is an enlarged longitudinal section taken approximately on line 5—5 in FIG. 1A with intermediate portions being broken away for illustrative convenience and with certain portions being shown in front of the plane of section.

FIG. 6 is a transverse section taken on a plane at a position indicated by line 6—6 in FIG. 5 and showing several pears further to illustrate the action of the bristles on the pears.

FIG. 7 is an enlarge showing of a portion of FIG. 6 still further illustrating the effect of the bristles on a pear.

FIG. 8 is an enlarged, fragmentary longitudinal section taken on line 8—8 in FIG. 1B with a discharge receptacle being shown in dashed outline and with pears being shown at selected location to illustrate the movement of the pears and the effect of the apparatus on the pears.

FIG. 9 is a fragmentary section taken on a plane indicated by line 9—9 in FIG. 8, but being somewhat reduced in scale from FIG. 8.

FIG. 10 is an enlarged, fragmentary section taken on line 10—10 in FIG. 1B with portions being broken away.

FIG. 11 is an enlarged, fragmentary section of a fruit conveying cup and centering ring used in the portion of the apparatus illustrated in FIG. 10, with a pear resting in the cup and with the ring spaced above the pear prior to centering thereof.

FIG. 12 is a view similar to FIG. 11 but with the ring engaging the pear so as to seat and center the same.

Before describing the method and apparatus of the present invention in detail, it will be helpful at the beginning to outline the successive steps in the process to which the fruit is subjected in the order in which they are subsequently described in detail. In FIGS. 2A and 2B, the path T of the fruit through the machine is indicated by the heavy dash line.

Step 1. Immersion of whole unpeeled pome fruit in a caustic bath as it travels from point A to point B of path T.

Step 2. Removal of the fruit from the bath at point B, the fruit being coated with caustic.

Step 3. Holding the caustically-coated fruit for a predetermined time as it travels from point B to point C.

Step 4. Steaming of the caustically-coated fruit under pressure as it is moved from point C to point D, but only after expiration of said predetermined time, thereby removing the skin from the fruit, said immersing, holding, and steaming steps being effective to heat-damage a layer of predetermined depth of each fruit.

Step 5. Removal of said heat-damaged layer of each fruit while applying water thereto as it travels from point E to point F whereby each fruit is peeled and has an exposed surface which is relatively firm, naturally colored, resistant to browning, and slippery, and Step 6. Mechanically processing each peeled fruit as it travels from point F to point G, including conveying and arranging the fruit in single file or files, orienting the axes and stem ends of the fruit, holding the fruit in their oriented positions, and stemming and coring the fruit while so held.

With these steps in mind, particular reference is made to the drawings in describing the subject apparatus and in explaining how such apparatus is used to perform the steps outlined, it being noted that the method and apparatus are conveniently described as used on pears. Thus, the apparatus provides a rigid support frame, generally identified by the numeral 15, that includes several sections none of which is described in detail but which are located along the entire fruit processing line shown in FIG. 1A, 1B, 2A and 2B. The immersing, removing and holding steps are performed in a first shuffle feeding unit 20 (FIGS. 1A and 2A), a tank or immersing unit 21 (FIGS. 2A and 3), and a holding unit 22, all of which are mounted on the frame. The feeding unit is a shuffler feeder of the type disclosed in the copending U.S. patent application of Donald W. Chamberlin filed February 19, 1962, and bearing Serial No. 174,118, said application being assigned to the assignee of the present invention, now Patent No. 3,088,577. Except for the manner in which is is driven, the feeder 20 is substantially identical to a second shuffle feeder 25 (FIG. 2B) which is in association with a fruit-orienting unit 26. Since the second feeder 25 is shown more fully in FIG. 8, the feeder 25 will be described to disclose the construction of both feeders 20 and 25. In general, each feeder comprises a rigid frame 25a on which a plurality of stationary flights 27 are mounted in inclined, spaced relation between two side plates 28. A movable flight 29 is disposed between each pair of adjacent stationary flights, and all of the movable flights are secured to a reciprocable mounting plate 30 which has a push rod 31 pivotally connected to its base. Reciprocation of push rod 31 will of course cause reciprocation of the plate 30. The push rod 31 of the shuffle feed 20 is reciprocated by means of a different type of drive mechanism than that which drives the reciprocating plate 30 of shuffle feeder 25. Referring to FIG. 3, it will be seen that the push rod 31 extends downwardly and forwardly in the machine and is pivotally connected to a crank (not shown) of a variable speed, electrically driven unit 33. The unit may be of the type marketed by U.S. Electrical Motors Inc. under the trade mark Varidrive. Referring to FIG. 8, it will be seen that the push rod 31 of feeder 25 is pivoted to a level 34 that is keyed to a shaft 32. The shaft 32 is oscillated by a link 36 that has an adjustable pivotal connection to a short lever 37 keyed to shaft 32 and is pivotally connected at 38 to a disc 40 that is keyed to a power driven shaft 41.

Each of the flights 27 and 29 has eight arcuate pockets or recesses 35 formed in its upper edge, and the recesses of adjacent flights are aligned to define eight pear-conveying lines. As the mounting plate 30 is reciprocated, each movable flight travels from a lower position, in which its pockets receive fruit from the pockets of the stationary flight next below, to an elevated position in which the fruit is delivered to the pockets in the stationary flight next above.

The variable speed drive associated with each shuffle feeder makes it possible to vary the rate of feeding of the pears. In the case of the feeder 20, the drive is adjusted so that the number of pears fed to the machine substantially equals the number of pears that can be handled by the coring and stemming mechanisms of the machine.

The pears are discharged from the feeding unit 20 into the immersing unit 21 (FIG. 3) which includes a housing 42 having a bottom wall 42a, side walls 42b, (FIG. 4) and a forward wall 42c including a sloping portion 42d which provides an opening 42e directly beneath the discharge end of the first feeding unit 20. The housing 42 also has a top wall 42f and a rear wall 42g. The housing contains a lye bath 47 having an upper surface 48 which is below the level of the opening 42e. A plurality of displacement tanks 50, which are fixedly secured to the side walls of the housing, are immersed in the bath 47 below the upper surface thereof, and are spaced from the bottom rear and front walls of the housing and from each other. The purpose of the tanks is to maintain the upper surface of the bath at a predetermined level while conserving the amount of lye required for the bath.

As will be more fully explained, the concentration and, especially, the temperature of the lye bath 47 are important factors in the present method. Although the present invention is not limited to the illustrated apparatus for controlling concentration and temperature, such apparatus is briefly described to aid in a better understanding of the invention. Thus, to recirculate the lye solution of the bath, a pump 55 (FIG. 2A) is provided which has a suction connection communicating with a line 56 that extends through the side wall of the housing adjacent to the rear wall 42g, and an outlet port communicating with a pressure conduit 59 extending along one of the side walls 42b of the housing. A valve 60, which is connected in the conduit 59, is normally closed, causing the lye to flow through a T 61 and through a short conduit 62 to a steam-heated heat exchanger 63. The heated lye leaves the heat exchanger through a conduit 64 and flows into two oppositely directed branch conduits 65 and 65a. Front and rear manifolds 66 and 67 (FIG. 2A) are connected in the conduit 65 in spaced relation to each other and project transversely of conduit 65 (FIGS. 1A and 3) into the housing above the upper surface 48 of the bath 47. A plurality of liquid disturbing jets 68 (FIG. 3) are connected to each of the manifolds and extend down into the bath between adjacent displacement tanks 50. A valve 69 (FIG. 1A) is connected in conduit 65 on the upstream side of manifold 67 which also communicates with valve 60. When valve 69 is closed, all of the lye flows through the heat exchanger 63 and is discharged through manifolds 66 and 67. If valve 60 is opened and valve 69 is closed, part of the lye will flow directly into manifold 67 without going through the heat exchanger, while another portion of the lye will flow through the heat exchanger to manifold 66.

The branch conduit 65a directs lye to a header 70 (FIG. 3) which extends across the interior of the housing 36 and has a plurality of short nozzles 70a for directing heated lye onto fruit being conveyed through the housing. If desired, a removable filter can be installed in branch conduit 65a.

In order to replenish the supply of lye in the bath 47, a lye make-up valve 75 (FIG. 2A) interconnects a source of lye having a concentration of approximately 50 percent, not shown, and the housing 36 and is controlled by a density controller 76 located in a control panel 78 mounted on one of the side walls 42b of the housing. This density controller, which may be of any commercial type such as the type marketed by Taylor Instrument Companies of Rochester, N.Y., measures the density of the lye in the tank by blowing air through a column of the lye and measuring the resistance of the lye to the passage of air. The controller is connected to the source of lye of 50% concentration and, when the concentration of the lye in the tank drops below the desired level, the controller 76 actuates the diaphragm valve 75 to admit more 50% lye to the tank. A float-controlled water valve 79 interconnects a source of water, not shown, and the housing for replenishing the supply of water in the bath. Due to the heat in the tank, water is constantly being evaporated. The valve 79 adds water to bring the solution up to the desired level. If the addition of water dilutes the solution excessively, the controller 76 operates to bring the concentration back to the desired level. In addition, a temperature controller 80 is mounted in the control panel and controls the temperature of steam in a steam line 82 leading to the heat exchanger 63.

For conveying the pears through the lye bath 47, a fruit immersing conveyor 85 (FIG. 3) is included in the immersing unit 21. The conveyor has a pair of upper sprockets 86, a pair of lower rear sprockets 87, a pair of lower front sprockets 88, and a pair of intermediate rear sprockets 89, the sprockets being keyed to shafts 86a, 87a, 88a and 89a respectively, that are rotatably mounted on the side walls 42b of the housing 42.

A pair of endless chains 91 are trained around the sprockets and are interconnected by a plurality of truncated trough-shaped conveying buckets 93 extending transversely between the chains. Each bucket has a pair of side walls 94 converging inward from the chains to a bottom wall 95 and an open top 96 spaced outward from its associated bottom wall. Furthermore, for a purpose to be described, the bottom wall and portions of the side walls adjacent to the bottom wall of each bucket are perforated. Adjacent side walls of adjacent buckets are pivotally connected to each other and to the chains by hinges 98 (FIGS. 3 and 4) which define bucket pivot axes extending transversely of the chains.

A conveyor drive mechanism, generally identified by the numeral 100 (FIGS. 2A and 3), includes an electric motor 101 which is mounted on a screw-type adjusting mechanism 102. The motor drives a shaft 103 through a well-known speed changing mechanism of the type wherein when the motor 101 is shifted relative to the shaft 103, the pitch of drive cones is automatically changed to vary the speed of shaft 103. The shaft 103 is connected through a chain to the shaft 86a of conveyor 85 for moving the buckets 93 downwardly along a pear receiving run 104 with the open tops of the buckets facing upward and passing successively under the opening 42e in housing 42, thence into the bath 47 at position A, thence along an immersing run 105 under the displacement tanks 50 with the buckets being inverted, thence out of the bath at position B, thence upwardly along a removing run 106 with the open tops of the buckets again facing up, and finally along a discharging run 107 wherein the buckets are gradually angled into a partially inverted position just before the buckets return to said receiving run.

In addition, the immersing unit 21 includes a lower fruit-retaining panel 110 secured to the bottom wall 42a of the housing 42 under the immersing run 105 of the conveyor 85. This panel has arcuate, outwardly projecting rear and front portions 111 and 112 concentric with the rear and front sprockets 87 and 88, respectively, the rear portion having perforations to permit flow of lye solution into the inlet 56 of the pump 55. Thus, the buckets 93 slide along this panel as they enter, traverse, and leave the immersing run 105. Also, an upper semi-cylindrical retaining panel 114 is mounted in the housing and extends transversely of the conveyor 85 between and concentric with the intermediate front sprockets 89. These panels cover the open tops 96 of the buckets 93 during inversion thereof along the immersing and discharging runs 105 and 107 and thereby insure the retention of the pears P in the buckets where such retention is desired. The upper retaining panel terminates in an upper edge 116, and a discharge chute 118 (FIGS. 1A and 3) mounted in the housing 42, declines rearwardly from the upper edge of the upper panel.

The holding unit 22 (FIG. 3) includes an elevator 125 having a lower end 126 projected into the housing 42 through the rear wall 42g thereof and under the discharge chute 118. The elevator provides a plurality of pockets 127 which carry pears received therein toward an upper end 128 of the elevator.

In carrying out the immersing, removing and holding steps of the subject method, pears P are continuously delivered in bulk to the feeding unit 20. These pears may range from hard immature pears, intended for cocktail use, to soft mature pears, intended for grade packing. However, it will be understood that, in general, the pears that are processed during a particular period of operation of the present machine will have approximately the same condition of ripeness.

The feeding unit 20 discharges rows of pears in the buckets 93 as they pass under the opening 42e. The conveyor 85 lowers the pears into the lye bath 47, which is maintained at a concentration of from about ten percent to about twenty percent by weight of lye in water and at a temperature no more than about one hundred and sixty degrees Fahrenheit; in order to minimize process time, it is preferred that the temperature be held above about one hundred and forty degrees Fahrenheit, but this lower temperature is not critical as is the upper temperature limit. It is also preferred to include a wetting agent in the lye bath. About 0.2% to about 0.5% by weight of a wetting agent sold by Union Carbide and known as Tergitol 08 (sodium 2 ethyl hexyl sulfate) serves very well for this purpose. Just before each bucket of pears is submerged in the lye bath, the pears in each bucket are sprayed with a warm lye solution from the input nozzles 70a. The conveyor travels at a speed which keeps the pears immersed in the bath during the immersing run 105 for a period in the range of from about one minute to about four minutes, this time being measured from the moment the pears are immersed at position A to the moment the pears are removed from the bath at position B. As the pears travel along the immersing run, and before reaching the downwardly-directed fruit-disturbing jets 68, they are buoyed upwardly by the solution toward and against the bottom walls and the lower portions of the side walls of their buckets. However, the entire outer surface of each pear is substantially uniformly contacted by the lye solution since, as the buckets pass under the jets 68, the jets force lye solution downwardly through the perforations in the buckets 93, and, by disturbing the solution and pears in each bucket, the jets move the pears out of contact with their respective buckets and out of contact with each other. It is to be noted that FIG. 3 shows two of the buckets and the pears therein just after passing under the jets and also shows that, as buckets move farther away from the jets, the solution once again buoys the pears upwardly toward the bottom walls.

The conveyor 85 lifts the pears P out of the bath 47 at position B and carries them upwardly along the pear-removing run 106. The pears, now coated with lye, are slid along the upper fruit-retaining panel 114 by their respective buckets 93 and are eventually discharged onto the chute 118 which guides them into the pockets 127 of the elevator 125. The elevator lifts the pears toward its upper end 128 where, at position C, these pears are discharged into a steaming unit 135. The time during which the pears are held out of the bath, referred to as the holding step or holding time, from position B to position C, is carefully controlled so that the total time during which lye is in contact with each pear between position A and position C is in the range of from about two minutes to about six minutes. That is, not only are pears contacted with lye along the immersing run 105 for predetermined time, but they are additionally contacted by their individual coatings of lye from positions B to C along the conveyor and the elevator. Thus, the speed of the elevator is adjusted according to the speed of the conveyor, having in mind the total contact time desired. As a result of the immersing and holding steps, the skins of the pears are weakened and preconditioned for subsequent removal.

The steaming unit 135 (FIG. 3) is a fluid-tight rotary pressure valve of the type disclosed in the United States Patent to de Back No. 2,638,137 and is mounted in the frame 15 under the upper end 128 of the elevator 125. The steaming unit provides a rotor 138 having a plurality of compartments 139 successively communicating with a fruit inlet 140 and a fruit outlet 141. A steam controller 143 (FIG. 2A) is mounted in the control panel 78 for controlling the pressure of the steam that is directed into the compartments of the steaming unit. Furthermore, a drive motor 146 (FIG. 3) is mounted in the frame for imparting rotation to the rotor whereby pears P discharged through the fruit inlet and into the rotor are subjected to steam under pressure for a predetermined time and are then discharged through the fruit outlet.

For receiving pears P from the steaming unit 135, a flume 150 is supported in the frame 15 and has a receiving end portion 152 under the fruit outlet 141 and an opposite discharging end portion 154 projecting rearwardly from the steaming unit (FIG. 2A). The flume is generally U-shaped in transverse cross-section and has a horizontal flange 153 extending longitudinally along each upper edge. A support plate 155, which has a ledge underlying and supporting one of the horizontal flanges of the flume, is secured to the frame on each side of the flume. The flume is mounted for fore and aft slidable movement, and a crank 156, mounted in the frame, is connected to the flume by a rack and gear assembly at 158 for sliding the flume back and forth along the ledges of the support plates 155. A water conduit 159 is mounted in the frame and projects water rearwardly through the flume to cool and rearwardly convey the pears which have been discharged from the steaming unit.

In performing the steaming step of the subject method, lye-coated pears are continuously discharged into the steaming unit 135 from the holding unit 22 and are thereupon subjected to steam under pressure in the range of from about about thirty pounds per square inch to about sixty pounds per square inch and for a time from about one second to ten seconds. The steam activates the lye on the pears whereupon the skins of the more mature pears are completely removed whereas the skins of the harder pears are removed but to lesser extent. The steamed pears are then discharged into the flume 150 and are carried and cooled in the flow of water from the conduit 159 toward the discharge end portion 154 of the flume.

As a result of the immersing, holding and steaming steps described above, most of the pears P have their skins either wholly or partially removed, and any skins remaining on the pears are in a state of disintegration, being thus conditioned for removal in the layer removing step outlined initially. In addtion, each pear has a layer of flesh of predetermined depth which, as an incident to the removal of the skins by the hot lye and steam, is heat-damaged and softened. This layer is highly susceptible to browning and if not removed, prevents convenient mechanical handling of the pears for stemming and coring purposes.

In order to remove this heat-damaged layer as well as any remaining skin, the subject apparatus provides a layer removing unit, specifically, a rotary brush washer 165 (FIGS. 5–7) which is supported in the frame 15 and is of the type disclosed in the copending U.S. Patent application of Frank D. Hickey et al., Serial No. 206,785 filed July 2, 1962 and now Patent No. 3,192,974. Because of the importance of the unique coaction between the above-described chemical treatment for the pears and type of brushing produced by this brush washer, the latter is described in some detail at this point, although reference may be had to said Hickey et al. application for a complete description of any mechanism not described completely herein. Thus, the brush washer (FIG. 5) includes a cylindrical drum 166 mounted for rotation about its longitudinal axis 167 which is slightly inclined upwardly from its fruit-receiving end to its dscharge end. The drum has a front end portion 169, which circumscribes the flume 150, and a rear end portion 170. A lining 173 of resiliently compressible material, such as plastic sponge or neoprene foam, is bonded to the inside wall of the drum, and a helical rib 175 is secured to the drum by brackets 177 and helically winds around the axis of the drum from the front end portion to the rear end portion thereof. Still further, a plurality of tumbling rods 180 may be mounted within the drum, radially inwardly from the lining, and are spaced circumferentially about the axis of the drum, but these rods may not be needed when the lining has a coefficient of friction high enough to tumble the pears. The front end portion of the drum provides an external ring gear 182 through which rotation is imparted to the drum.

The brush washer 165 (FIG. 5) also includes a rotary brush 186 having a pair of stub shafts 185 and 187 defining a brush axis disposed in spaced parallel relation to the axis 167 for the drum. As seen in FIG. 6, the brush axis is spaced below and to one side of the drum axis. Discs 188 are secured to the stub shafts 185 and 187, and angle irons 189 (FIG. 7) are rigidly connected to the discs to form a frame for the brush. Further, a driven sprocket 190 (FIG. 5) is secured to the end of the shaft which is adjacent to the front end portion 169 of the drum.

The brush 186 includes four clusters 191 (FIGS. 5 and 7) of elongated flexible longitudinally crimped or undulated bristles, preferably of nylon. Each cluster of bristles (FIG. 5) has opposite sides and extends longitudinally in the drum 166 through about the rearward two-thirds thereof. The bristles in each cluster have base ends 193 (FIG. 7) which are clamped in a U-shaped bracket 194, and opposite tips 195. The characteristics, such as flexibility, surface texture and length of the bristles, and the position of the brush in the drum play an important part in successfully removing the heat-damaged layer of the pear without damaging the underlying flesh. As an indication of what is meant by flexible bristles, actual embodiments perform very satisfactorily when the bristles are of nylon, are each about 0.011 inch in diameter, and are each about six inches long from base end 193 to tip 195; and when each cluster has a thickness of about ⅜ of an inch at point X (FIG. 7) where the bristles emerge from their bracket 194. As an indication of brush positioning, actual embodiments operate very satisfactorily when the brush axis is disposed in the lower left portion of the drum, which rotates in a clockwise direction (FIG. 6), and when the minimum spacing between the tips of the bristles in each cluster and the lining 173 is about ¾ of an inch, this spacing being measured, when no pears are present, along a radial line extending from the axis of the brush when each cluster is directed downward and lies in a plane 197 passing through the axis of the brush and the axis 167 of the drum.

The brush washer 165 also includes water pipes 200 (FIGS. 5 and 6) extending through the drum 166 and being mounted generally parallel to the shafts 185 and 187 on the opposite sides of the flume 150 and the brush 186. The water pipes have a common inlet end 201 connected to a source, not shown, of water under pressure, and a plurality of spray jets 202, connected to the pipes, are directed downward toward the lining 173 and the described area of minimum bristle spacing. Furthermore, a drain pan 204 (FIG. 5), having a drainage outlet 206, is mounted under the drum for receiving and discharging liquid and fruit fragments draining from helical slots 207 located under the helical rib 175.

In order to impart rotation to the drum 166 and to the brush 186, a drive motor 210 (FIG. 5) is connected by a drive gear 211 to the ring gear 182 of the drum and by a chain 212 in mesh with the driven sprocket 190 for the shaft 185. For processing pome fruit as described herein, the drum and the brush are rotated in the same direction with the brush preferably rotating at about 300 r.p.m. and the drum rotating at about 20 r.p.m.

In carrying out the layer removing step of the subject method, as outlined above, pears P with heat-damaged outer layers and possibly some skins, are continuously discharged from the flume 150 into the drum 166, it being noted that the flume can be longitudinally adjusted to adjust the position of discharge of the pears with respect to the length of the drum. Thus, by adjusting this position of discharge, the length of time the pears are in the brush washer is adjusted; for example, the more immature fruit usually requires more brush-washing than the mature fruit.

The pears drop onto the lining 173 of the drum 166 and are moved upwardly, as viewed in FIG. 6, because of the frictional engagement of the lining with the pears. In addition, the pears are moved lengthwise of the drum toward the rear end portion 170 because of the helical rib 175. Of course, the pears fall downwardly after reaching a certain height onto a lower portion of the lining or against succeeding pears which are in frictional engagement with the lining. The friction of the lining alone, or in cooperation with the rods, tumbles the pears each time they fall. Thus, the pears are tumbled over and over as they travel toward the rear end portion of the drum.

During this tumbling movement of the pears P, they are engaged by the clusters 191 of bristles in the brush 186 (FIGS. 6 and 7). Considering the action of one cluster of bristles on one of the pears, the forward side 192 of the cluster, with respect to the direction of rotation of the brush, initially engages the outer heat-damaged layer of the pear and wipes thereacross with the bristles flexing rearward from the shaft 185 with respect to the direction of rotation of the brush. Since the bristles are flexible, that is not stiff and unyielding, the tips 195 do not dig into or gouge the pear in an undesired manner. Instead, the side and tips of the bristles gently wipe across the pear and follow its contour thereby lightly scraping off the very soft, heat-damaged flesh L (somewhat exaggerated in thickness in FIG. 7). Furthermore, the pear moves lengthwise of the bristles (FIG. 5) since the pear is being moved lengthwise of the drum by the helical rib 175. Thus, the sides of the bristles also gently scrape the soft flesh from the pear. It will be appreciated that in conforming to the pear contour, the bristles reach irregular surfaces and cavities so as to act on the entire pear periphery. In addition, rubbing of the pears against the lining removes some of the soft flesh. It is to be noted that the lining should have a coefficient of friction high enough to tumble the pears and low enough not to bruise them; closed-cell, neoprene foam serves very well in this regard. The closed-cell structure of the neoprene facilitates cleaning of the lining by preventing undesired entry of fruit particles into the lining and the resultant internal bacterial contamination which would be difficult to clean.

The described brushing and rubbing actions are uniquely suited to the task of removing the very soft outer layer without damaging the flesh under said layer, it being well-known that choice mature pears, even without any heat-damage portions, are delicate and can be easily gouged and damaged by even manual finger pressure. From the foregoing it will be understood that the success of the process is largely dependent upon careful coordination of the chemical treatment and the layer removal. That is, the conditions of chemical treatment must be controlled, as described herein, so that the damaged layer is of predetermined depth, and the character of the brushing action must be controlled, as also disclosed herein, so as to remove substantially only this depth of flesh. Although the depth of this layer cannot be precisely stated, it is in the order of ⅟₆₄ of an inch. During this brushing action on the pears, water is continuously sprayed against the pears from the spray outlets 202 whereby the loose, removed flesh and skin fragments are washed away from the pears, residual caustic is washed off, and the exposed surfaces of the pears are wetted.

After the pears P have passed through the drum 166, they are discharged through the rear end portion thereof, at position F, whereas the rinse water and removed flesh and skin particles are discharged from the slots 207 into the drain pan 204 and thence out the drainage outlet 206. The discharged pears still have their cores intact and have exposed surfaces which are naturally colored, that is substantially white. They are also conditioned for mechanical handling, including stemming and coring, since they are relatively firm and slippery. Further, since the soft, heat damaged layer of each pear has been removed by the brush washer 165 so that the exposed flesh of each pear is flesh which was not appreciably penetrated by heat in the immersing, holding and steaming steps, the pears are quite resistant to browning, that is they resist browning for a time sufficient to stem, core and can them.

Receiving these pears P from the brush washer 165 is the second shuffle feeding unit 25 (FIG. 8). A particular feature of the shuffle-feeder resides in the fact that the lowermost points, as 232, in the pockets 35 of the movable flights 29 are on the opposite sides of the centerlines CL for their respective lanes from the lowermost points, as 234, in the pockets of the stationary flights 27.

The second feeding unit 25 is required since the pears which are discharged in bulk from the brush washer 165 must be arranged for stemming and coring purposes in a plurality of lanes, eight in the disclosed embodiment, with the pears in each lane moving at a predetermined speed and in predetermined spaced relation to each other. Thus, pears emerging from the brush washer fall onto a chute 238 and gravitationally slide onto the flights 27 and 29. The pears are spread over the feeding unit while being advanced because of the continuous oscillation of the movable flights with respect to the stationary flights and the coaction between the pockets 35 on the upper edges of the flights. Thus, the pears are separated into eight lanes with uniform spacing between adjacent pears in each lane, and with the pears being discharged from the feeding unit at a predetermined rate. Reference is made to the above cited U.S. Patent No. 3,088,577, for a detailed explanation of how the pears are arranged in a single file in each lane by the feeding unit.

The second feeding unit 25, therefore, discharges pears P in the described manner to the pear aligning unit 26 (FIG. 8) which includes a plurality of troughs 251 corresponding in number to the number of lanes. The pears in each trough are slid therealong by depending paddles 252 of an endless advancing conveyor 253 and are eventually discharged into a discharge receptacle 255 at the end of the trough. The purpose of the aligning unit, which is more fully disclosed in the U.S. application of Gerald R. Anderson et al. Serial No. 206,787, filed July 2, 1962, is to move each pear into its respective receptacle with the butt end of the pear rearmost as seen in FIGURE 8. It is to be noted that, as the pears are slid along in the trough, their butt end portions engage the sides of the trough whereupon pears which are upright swing about horizontal axes until their stem ends point down. Cooperative action of the trough and the paddles then angles the pears about ninety degrees prior to their entering the receptacle. It is evident that the described slipperiness and firm flesh of the pears enables the described action of the aligning unit. After receiving a pear, each discharge receptacle is pivoted downward, as shown in dashed outline in FIG. 8, to allow its contained pear to slide up gravity into a cup 258 of a continuously moving conveying unit 260, each cup having internal frusto-conical surfaces. Since the pear is slid into the discharge receptacle in a substantially horizontal position with its butt end rearmost, it slides out of the cup with its stem end down.

The conveying unit 260 is driven from a motor 261 (FIG. 1B) which drives a shaft 262 (FIG. 2B) through a bevel gear drive 263. An idle shaft 264 (FIG. 8) of conveyor 260 drives the shuffle feed operating shaft 41 through gears 265 and 266. It will also be noted that the shaft 41 is connected in driving engagement with a drive shaft 267 of the aligner conveyor 253 by means of a chain and sprocket drive 268. With this drive arrangement the shuffle feed 25, the aligner conveyor 253, and the conveyor 260 are driven in timed relation so that the feeder delivers one pear to a position in front of each paddle 252, and each paddle delivers a pear to each cup of conveyor 260.

The conveying unit 260 (FIGS. 8 and 10) moves the pears P past a stemming station 270 (FIG. 10) and a coring station 271 and, after the pears are stemmed and cored, discharges the pears onto a takeway conveyor 275, at position G. A stemming and coring unit 280, more fully described in the U.S. Patent application of Gerald R. Anderson Serial No. 206,955, filed July 2, 1962, is provided adjacent to the conveying unit 260 and includes a stemming mechanism 281 at the stemming station 270 and a coring mechanism 282 at the coring station 271. The stemming mechanism and the coring mechansim provide a fruit centering cup 283 and centering ring 284, respectively, each of which has an internal frusto-conical surface for engaging and seating the pears in the conveyor cups 258 and for bringing the axis Pa (FIG. 11) of each pear into alignment with the axis of the conveying cups and the axis of the centering cup or centering ring, as the case may be. The stemming mechanism (FIG. 10) provides a stemming tube 286 which cuts around the stem of each pear at stemming station for enabling removal of the stem from the pear. In addition, the coring mechanism provides a coring knife 287 which enters the bore cut in each pear by the stemming tube and cleans the seed cavity of each pear, all as more specifically described in the Anderson application mentioned above.

In order to understand how the stemming and coring unit 280 orients each pear P at the stemming and coring stations 270 and 271, the centering ring 284 for the coring mechanism 282 is shown in more detail in FIGURES 11 and 12. Thus, as a conveying cup 258 moves a pear rearwardly into the coring station, this centering ring moves simultaneously rearwardly and downwardly into engagement with the butt end of the pear whereby the pear is slid around in the conveying cup and against the centering ring until it is substantially coaxial with the ring and the cup. The ring and the cup then hold the pear in this coaxial position as the pear is cored by the coring knife 287. Each pear is similarly axially oriented and seated by the centering cup 283 and by the conveying cup 258 during stemming by one of the stemming tubes 286.

It is believed evident that the slippery, firm surfaces of the peeled pears P facilitate movement and orientation of the pears as they are mechanically handled, between positions F and G, by the second feeding unit 25, the aligning unit 26, the conveying unit 260, and the stemming and coring unit 280. Thus, when the pears are discharged onto the takeway conveyor 275, they are peeled, cored, and stemmed, and they still have naturally colored white surfaces. The takeway conveyor moves the pears on for further processing eventually arriving at a canning station, not shown, before noticeable browning occurs.

Several conclusions have been made as a result of processing pome fruit according to the present invention. First, there is a correlation between yield and browning rate following emergence of the fruit from the brush washer 165. It is desirable, of course, to maximize yield, that is the amount of edible fruit, and to retard the browning rate while satisfactorily peeling the fruit. In this regard, it is to be noted that whole unpeeled pears usually have about eight percent by weight of peel. Thus, a yield of 89%, for example, represents the removal of 11% of pear, or 3% more than the actual peel, and is a high yield. Furthermore, soft marketable pears may have a natural browning rate, produced by cutting or tearing and not related to heat damage, of about thirty minutes; it is to be understood, however, that the natural browning rates of different lots of pears, and other pome fruit, may vary depending on their maturity, geographical location, practices of cultivation, ripening, and the like, so that the specified natural browning time of thirty minutes is to be regarded only as an approximate standard. It is, of course, evident that the fruit is exposed to the atmosphere for a predetermined time after their emergence from the brush washer until they are canned following stemming and coring. Although the time between the brush washer emergence and canning varies, it is found that if noticeable browning can be retarded for about thirty minutes, there is sufficient time to can the fruit.

With the foregoing discussion of the yield and browning time in mind, if pome fruit is processed according to the present invention, yields of edible fruit in the range of 85% to 90% are obtainable. Furthermore, the time before noticeable browning occurs can be extended to about thirty minutes. To obtain these results certain ranges of working conditions should be maintained, as follows: The lye bath concentartion should be from about 10% to about 20% by weight; the lye bath temperature should be about 140° F. to no more than about 160° F.; the lye immersion time should be from about 1 minute to about 4 minutes; the holding time (from A to C in FIG. 2A) is in the range of from about 2 minutes to about 6 minutes; the steam pressure should be in the range from about 30 p.s.i. to about 60 p.s.i.; and the steaming time should be from about 1 second to about 10 seconds.

It is further concluded from process tests that the upper limit of the temperature of the lye bath 47 is a critical factor in controlling yield and browning rate. For soft pears, for example, that is pears which are the most delicate and difficult to peel and handle mechanically, it is most practicable if the lye bath temperature is in the range of from about 140° F. to about 155° F.

Above 155° F., losses resulting from heat damage increase rapidly. Above 160° F. losses either equal or exceed losses resulting from mechanical peeling or browning occurs too rapidly to permit canning within practical time limits.

It is also to be noted that the subject process may be operated at temperatures lower than 140° F. but such operation is not preferred since there is no advantage obtained in yield or browning rate whereas there is a disadvantage in that longer immersion times are required to obtain satisfactory peeling.

In summary, the subject method has solved the problems of the chemical peeling of pome fruit on a commercial scale. Within the ranges of the times, temperatures, and other conditions specified above, the subject method renders the chemical peeling of pome fruit commercially practicable whereas previously it has been commercially impracticable. By overcoming the probelms of browning and mechanical handling of chemically peeled fruit, the present method produces significant increases in yield over the yield obtained by mechanical peelers. It also makes practicable the use of an integrated and substantially completely automated processing line where whole unpeeled fruit are first chemically treated, and then mechanically surfaced, manipulated and cored while the fruit is continuously moved along the line. As a result, the volume of fruit which can be peeled, stemmed and cored within a given time is considerably increased and the amount of labor required is reduced, as compared with volume obtainable with and labor needed to operate conventional mechanical peelers and coring apparatus.

It will be understood that changes and modifications may be made in the method and apparatus disclosed without departing from the spirit and scope of the appended claims.

The invention having thus been described, what is believed to be new and desired to be protected by Letters patent is:

1. In a method of processing pome fruit as they are continuously conveyed along a line, the steps of caustically treating unpeeled whole pome fruit having their cores integral therewith in order to precondition the skins for removal; mechanically engaging exteriors of the caustically treated fruit in the presence of water as the fruit are conveyed along said line to remove the layer of each fruit which has undergone appreciable heat-damage as a result of said caustic treatment whereby the exposed flesh of each fruit is relatively firm, resistant to browning, and slippery after said layer has been removed; sliding the fruit along said line following removal of said layers from the fruit and simultaneously arranging the fruit in a single file with axes of the fruit oriented in a predetermined manner; and coring the fruit in said single file as the same are further conveyed along said line.

2. A method of peeling pome fruit comprising the steps of immersing unpeeled pome fruit in a caustic bath at a temperature no greater than 160° F.; removing said fruit from the bath with a coating of caustic on the skin of the fruit and holding the fruit for a predetermined time whereby its skin is preconditioned for removal; steaming the caustically coated fruit under pressure for an interval of from 1 to 10 seconds upon the expiration of said predetermined time so as to activate said caustic and thereby substantially completely remove the skin from said fruit and expose a layer of flesh of predetermined depth which layer is soft and heat-damaged as a result of said immersing, holding and steaming; and removing said soft outer layer of flesh from said fruit to expose a relatively firm, undamaged and naturally colored surface which is resistant to browning and easy to handle mechanically.

3. A method for preparing whole unpeeled pome fruit for canning comprising heating the fruit to remove the skin therefrom, said heating causing heat to penetrate into the flesh of the fruit to heat-damage and to soften a layer of flesh immediately under the skin of the fruit, removing the softened and heat-damaged layer of flesh on the fruit to expose a surface of relatively firm flesh which has not been appreciably penetrated by heat whereupon said fruit is peeled but is in an unoriented position, conveying the slippery peeled fruit past stemming and coring stations, engaging said exposed surface of the fruit while it is being conveyed and sliding it around until it is in a predetermined axial position with respect to said stations, holding the fruit against sliding movement thereby maintaining it in said predetermined position, and cutting into the fruit at said stemming and coring stations to remove the stem and the seed cell from the fruit while maintaining it in whole condition except for the removed skin, layer, stem and seed cell.

4. A process of peeling pome fruit comprising the steps of immersing whole unpeeled pome fruit in a caustic bath at a temperature no greater than 160° F.; removing the fruit from the bath with a coating of caustic on its skin; holding the fruit for a predetermined time whereby the skin is conditioned to be removed; steaming the coated fruit under pressure for an interval of from 1 to 10 seconds upon the expiration of said predetermined time so as to activate said caustic and thereby substantially completely remove said skin from said fruit and expose a layer of flesh of predetermined depth which layer is soft and caustically-damaged as a result of said immersion, holding, and steaming; and lightly brushing and washing off said soft outer layer of flesh from said fruit to expose fruit flesh which is relatively firm, undamaged and naturally colored and which is resistant to browning and easy to handle mechanically.

5. A method of chemically and mechanically preparing a pome fruit for preservation comprising immersing a pome fruit in heated fluid under conditions of time and temperature which are sufficient to remove substantially all of its skin but which soften and heat-damage its flesh to a predetermined depth immediately under the skin; removing the soft heat-damaged flesh and any remaining skin in the presence of water so that the fruit has a relatively firm, slippery exposed surface; mechanically engaging said exposed surface of the fruit to convey it along a predetermined path, to slide it into position with its axis in predetermined angular relation to said path, and then to maintain it in said predetermined relation, the slipperiness of said surface facilitating said sliding; and stemming and coring said fruit while maintaining said angular relation.

6. In chemically and mechanically preparing a pear and the like for preservation wherein a whole unpeeled pear is immersed in a heated fluid at a temperature no greater than 160° F. which removes substantially all of the peel from the pear but also heat-damages and softens a thin layer of the pear's flesh immediately under the peel, the softness of said layer rendering the pear unsuitable for mechanical handling and the heat-damage to said layer making said layer susceptible to rapid browning, the method of removing said layer and conditioning said pear for mechanical handling comprising tumbling the pear, and brushing the tumbling pear with an elongated cluster of flexible bristles having tips, said cluster having opposite sides extending lengthwise of the cluster, said brushing being performed by initially moving a side of the cluster in a predetermined direction against the tumbling pear so that the bristles flex rearwardly with respect to said direction and the tips gently scrape said outer layer of flesh from the pear and by simultaneously moving the tumbling pear longitudinally of the cluster along a side thereof whereby the bristles flex in conformity with the contour of the pear and scrape said outer layer of flesh from the pear because of relative movement between the pear and the bristles transversely of the bristles.

7. A method of processing pome fruit, each of which has a stem-blossom axis passing through opposite ends of the fruit, comprising the steps of immersing a plurality of whole unpeeled fruit in a caustic bath of predetermined temperature and concentration and for a time sufficient to precondition the skin of the fruit for removal; removing the fruit from the bath and holding it for a predetermined time; steaming said fruit under pressure whereby the skin of each fruit is substantially completely disintegrated and almost entirely removed from the flesh of the fruit and whereby a layer of flesh under the skin is incidentally heat-damaged and softened and made conducive to rapid browning; simultaneously wetting and lightly brushing the exteriors of said fruit to remove the heat-damaged and softened layers and to expose a relatively firm, white surface on each fruit, which surface is slippery, said fruit being thereby peeled; conveying the peeled fruit along a predetermined path during which each fruit is spaced from all other fruit; individually orienting each fruit so that its axis is positioned substantially normal to said path as it moves therealong; slidably grasping opposite portions of each fruit to hold each fruit in its axially oriented position; and cutting into each fruit along its axis as it moves along said path to remove the stem and clean out the seed cells in the fruit.

8. A method of preparing whole pears and other pome fruit for canning wherein the pears are continuously moved along a predetermined path from a peeling station to a coring station, comprising the steps of feeding the pears in bulk to the peeling station; immersing the bulk fed pears in a caustic bath at said peeling station to coat said pears with caustic; removing the coated pears from said bath and holding them for a predetermined interval to precondition the skins of the pears for subsequent removal; steaming the coated pears under pressure upon expiration of said interval to remove said skin therefrom, said steaming causing said pears to have a soft, heat-damaged outer layer of flesh which is exposed upon removal of said skin and which is highly susceptible to browning in a short time and makes mechanical handling of the pears very difficult; simultaneously tumbling, lightly brushing and spray washing said pears to remove substantially only said outer layer so as to provide the pears with exposed flesh which is relatively firm, white, and slippery and which is resistant to browning for a predetermined time considerably greater than said short time; slidably conveying the peeled pears toward said coring station; mechanically engaging the outer firm and slippery surface of each pear while it is being conveyed and thereby sliding the pear into a predetermined axial position; grasping each pear to hold it against sliding and to maintain it in its predetermined axial position; and cutting into each pear while so grasped and held and at said coring station thereby to core each pear, the time interval between said brushing and coring being less than said predetermined interval.

9. A method of peeling pears and other pome fruit comprising immersing whole unpeeled pears ranging from relatively hard cocktail pears to relatively soft, grade-pack pears in a caustic bath having a concentration of about 10% to about 20% by weight of caustic in water and a temperature from about 140° F. to about 160° F. and for a duration from about 1 minute to about 4 minutes and then removing the pears from the bath whereby the skins of the pears are coated with caustic; holding said caustically coated pears so that the total time of caustic contact with the skins in said immersing and holding steps is greater than 2 minutes but no more than about 6 minutes whereby the skins of the pears are conditioned for subsequent removal; steaming said pears under a pressure from about 30 p.s.i. to about 60 p.s.i. and for about 1 second to about 10 seconds thereby substantially entirely removing the skins from the pears; said immersing, holding and steaming causing said pears to have a heat-damaged layer which is exposed as a result of said skin removal; and lightly brushing said exposed layers of the pears to remove said heat-damaged layers.

10. A method of peeling pears comprising immersing whole soft, mature unpeeled pears in a caustic bath having a temperature from about 140° F. to about 155° F.; removing the pears from the bath with the skins still remaining on the pears and being coated with caustic; holding said caustically coated pears for a time sufficient to condition the skins for subsequent removal; steaming said caustically coated pears under pressure for a time sufficient substantially entirely to remove the skins from the pears; said immersing, holding and steaming causing each of said pears to have a heat-damaged layer which is exposed as a result of said skin removal; and lightly brushing said exposed layers of the pears to remove said layers.

11. In a method of peeling whole unpeeled pome fruit, the steps of immersing the fruit in a caustic bath at a temperature no greater than about 160° F., removing the fruit from the bath with the skins still remaining on the fruit and being coated with caustic, holding said caustically-coated fruit for a time which in addition to the time of immersion is sufficient to allow the caustic to weaken the skins for subsequent removal, and removing the skins and caustically damaged, soft flesh immediately under said skins to expose browning resistant, firm flesh.

12. The method of claim 11 wherein the total holding and immersing time is between about 2 minutes to about 6 minutes.

13. A method of peeling pears and other pome fruit comprising immersing whole unpeeled pears in a caustic bath at a temperature no greater than about 160° F.; removing the pears from the bath with the skins still remaining on the pears and being coated with caustic; holding said caustically coated pears for a time sufficient to precondition the skins of the pears for removal; steaming said pears under a pressure from about 30 p.s.i. to about 60 p.s.i. and for about 1 second to about 10 seconds thereby substantially entirely removing the skins from the pears; said immersing, holding and steaming causing said pears to have a heat-damaged layer of predetermined thickness which is exposed as a result of said skin removal; and lightly brushing said exposed layer of each pear to remove said layer so that relatively firm fruit flesh which is resistant to browning is exposed.

14. A method of peeling pears and other pome fruit comprising immersing whole unpeeled pears in a caustic bath having a concentration of about 18% by weight and a temperature no greater than about 160° F. and for a duration from about 2 minutes to about 3 minutes and then removing the pears from the bath whereby the skins of the pears are coated with caustic; holding said caustically coated pears for a time sufficient to partially disintegrate the skins of the pears; steaming the caustically-coated, partially disintegrated skins under a pressure from about 30 p.s.i. to about 60 p.s.i. and for about 1 second to about 10 seconds thereby substantially entirely removing the skins from the pears; said immersing, holding and steaming causing said pears to have a heat-damaged layer which is exposed as a result of said skin removal; and lightly brushing said exposed layer of each pear to remove said layer and to expose fruit flesh which is relatively firm and resistant to browning.

15. An apparatus for processing pome fruit comprising means for continuously moving the fruit along a processing line successively past a preconditioning station, a layer removing station, and a coring station; means at said preconditioning station for caustically treating unpeeled whole pome fruit having their cores intact in order to precondition the skins of the fruit for removal; means at said removing station for mechanically engaging the exteriors of the caustically-treated fruit as they are conveyed along said line to remove the layer of each fruit which has undergone appreciable heat damage as a result of said caustic treatment and to expose flesh of each fruit which is relatively firm and resistant to browning;

and means at said coring station for removing the core of each fruit.

16. An apparatus for preparing pome fruit for canning comprising means for immersing the fruit in hot-fluid which removes the skin from the fruit and incidentally heat-damages and softens a layer of flesh immediately underneath the skin; means for washing and lightly brushing each fruit to remove said layer of flesh and to provide the fruit with a relativetly firm, slippery outer surface; means for conveying the peeled fruit from said washing and brushing means successively past stemming and coring stations; said conveying means including means for individually slidably engaging the slippery outer surface of each fruit for guiding the fruit into predetermined axially oriented positions prior to arrival at said stemming station; means for grasping each fruit after it is oriented and for further orienting and holding it in said further oriented position as it travels past said stations; and means at said stations for stemming and coring each fruit while it is held in said further oriented position.

17. An apparatus for chemically and mechanically preparing whole unpeeled fruit as said fruit is continuously delivered in bulk to an input station of said apparatus and peeled fruit is continuously taken away from an output station of said apparatus, comprising a lye bath; means for conveying whole unpeeled fruit at a predetermined speed into, through, and out of said bath whereby the fruit is immersed in the bath for a predetermined time; first feeding means at said input station for receiving said delivered fruit and for feeding the same into said conveying means at a predetermined number of fruit per minute; a brushing and washing unit for washing and lightly brushing the fruit after it is removed from said bath and for simultaneously moving the fruit toward said output station; means for receiving fruit from said conveying means and for transporting said fruit into said brushing and washing unit; a conveyor including a plurality of uniformly spaced cups movable in timed relation to said first feeding means past a stemming and coring station to said output station; means for receiving fruit in bulk from said brushing and washing unit and for conveying them in single file with the fruit spaced uniformly and moving at substantially constant speed toward said output station; orienting means for receiving fruit one-by-one from said single file conveying means and for discharging such fruit one at a time and with their stem ends pointing in the same direction into the cups of said conveyor; and means respectively located at said stemming and coring stations for cutting out the stem and the core of each of the fruit in said cups.

18. A method of processing pome fruit, each of which has a stem-blossom axis passing through opposite ends of the fruit, comprising the steps of treating a plurality of whole unpeeled fruit in a caustic medium of predetermined temperature and concentration and for a time sufficient to precondition the skin of the fruit for removal; steaming said fruit under pressure whereby the skin of each fruit is substantially completely disintegrated and almost entirely removed from the flesh of the fruit and whereby a layer of flesh under the skin is incidentally heat-damaged and softened and made conductive to rapid browning; contacting the exteriors of said fruit to remove the preconditioned skin and said layer of flesh and to expose a relatively firm, white surface on each fruit, said fruit being thereby peeled; conveying the peeled fruit along a predetermined path during which each fruit is spaced from all other fruit; individually orienting each fruit so that its axis becomes positioned in a predetermined direction relative to said path as it moves therealong; engaging opposite portions of each fruit to hold each fruit in its oriented position; and cutting into each fruit along its axis as it moves along said path to remove the stem and clean out the seed cells in the fruit.

19. An apparatus for preparing pome fruit for canning comprising means for contacting the fruit with hot-fluid which attacks the skin and loosens it from the fruit and incidentally heat-damages and softens a layer of flesh immediately underneath the skin; means for removing the outer portion of each fruit to remove said layer of flesh and to provide the fruit with a relatively firm outer surface; means for conveying the peeled fruit from said layer-removing means successively past stemming and coring stations; said conveying means including means for individually slidably engaging the peeled outer surface of each fruit for guiding the fruit into predetermined axially oriented positions prior to arrival at said stemming station; means for grasping each fruit after it is oriented and holding it in said oriented position as it travels past said stations; and means at said stations for stemming and coring each fruit while it is held in said further oriented position.

References Cited by the Examiner
UNITED STATES PATENTS

| | | | |
|---|---|---|---|
| 1,237,623 | 8/1917 | Dunkley | 146—231 |
| 1,312,332 | 8/1919 | Kirino | 146—241 X |
| 1,389,796 | 9/1921 | Thompson | 146—232 |
| 1,472,717 | 10/1923 | DuPont et al. | 134—99 |
| 1,753,902 | 4/1930 | Nevills | 146—231 |
| 2,097,479 | 11/1937 | Taylor | 146—228 |
| 2,111,285 | 3/1938 | Haynie | 134—99 |
| 2,548,798 | 4/1951 | Irons | 146—50 |
| 2,664,129 | 12/1953 | Coons | 146—52 |
| 2,781,070 | 2/1957 | Kilburn et al. | 146—47 |
| 2,847,334 | 8/1958 | Kilburn et al. | 146—235 |
| 2,910,393 | 10/1959 | Magnuson et al. | 146—241 |
| 2,936,012 | 5/1960 | Magnuson et al. | 146—47 |
| 3,096,800 | 7/1963 | Creed et al. | 146—52 |
| 3,115,174 | 12/1963 | Loveland et al. | 146—235 X |
| 3,115,175 | 12/1963 | Loveland et al. | 146—235 X |

OTHER REFERENCES

Food Industries: "Peeling with Lye," June 1948, pages 101–108.

LESTER M. SWINGLE, *Primary Examiner.*

J. SPENCER OVERHOLSER, *Examiner.*

WILLIE G. ABERCROMBIE, *Assistant Examiner.*